United States Patent [19]

Greene

[11] Patent Number: 4,998,355

[45] Date of Patent: Mar. 12, 1991

[54] APPARATUS AND METHOD FOR POSITIONING OPPOSING MARKS ON OPPOSING SURFACES

[76] Inventor: Teddy R. Greene, 2171 Research Dr., Livermore, Calif. 94550

[21] Appl. No.: 474,600

[22] Filed: Feb. 2, 1990

[51] Int. Cl.[5] .......................... B25H 7/00; G01B 3/14

[52] U.S. Cl. ......................................... 33/667; 33/562; 33/194; 33/197; 33/669

[58] Field of Search ................. 33/666, 667, 562, 563, 33/566, 194, 197, 528, DIG. 10, 669, 677, 671, 613, 623, 644, 645, 1 AA, 574, 575

[56] References Cited

U.S. PATENT DOCUMENTS

| | | | |
|---|---|---|---|
| 292,463 | 1/1884 | Bassett | 33/197 |
| 664,910 | 1/1901 | Voight | 33/197 |
| 2,862,302 | 12/1958 | Lucia | 33/197 |
| 3,526,947 | 9/1970 | Pasek | 33/562 |
| 4,640,019 | 2/1987 | Paley | 33/197 |

*Primary Examiner*—William A. Cuchlinski, Jr.
*Assistant Examiner*—Alvin Wirthlin
*Attorney, Agent, or Firm*—Townsend and Townsend

[57] ABSTRACT

A marking device for accurately positioning two opposing marks on two opposing surfaces, for use in aligning two members in accurate registration with one another. The device is formed of a flexible, foldable, flat sheet, which is folded in half at its midportion. The two halves contain matching patterns of holes such that when the sheet is in its folded configuration the holes at each pattern lie in registration with one another. The two halves of the sheet are marked with corresponding indicia, which label corresponding holes of the two patterns. The opposing end portions of the two halves are each adapted to be removably secured to the structure being marked. Two opposed alignment marks are made by securing a first half of the strip against a first surface and making a mark through one of the holes. With the second half of the strip in registration with the first half, the second half is secured to the second surface. The first half is then removed from the first surface and a mark is made on the second surface through the hole in the second pattern corresponding to the first hole.

2 Claims, 1 Drawing Sheet

APPARATUS AND METHOD FOR POSITIONING OPPOSING MARKS ON OPPOSING SURFACES

BACKGROUND OF THE INVENTION

The present invention relates generally to the building and construction trades and is more particularly directed to devices for marking pairs of aligned positions for installation of various assemblies.

A certain type of burglar alarm system employs a small magnet, which is installed in an edge of a door or window, and a magnetically sensitive switch, which is installed in the door frame or window frame at a position opposite the magnet. For reliable operation of the alarm system the magnet has to be aligned precisely opposite the switch when the door or window is closed. In the past to install such a magnet/switch pair, an installer generally first installed one unit of the pair (either the magnet or the switch) by drilling a hole at the desired location to receive the unit. The installer then proceeded to make a series of measurements from the first hole to determine the location of the second hole in the opposing window, door or framing member for the other unit of the pair. This procedure takes time and can lead to inaccuracies if not carefully carried out because a slight error in one measurement can be compounded as the several measurements are made to locate the second unit.

The same problem arises in other contexts, too. For example, when installing a door knob a hole is drilled in the edge of the door through which the latch bolt protrudes and a cutout is typically made for a covering faceplate. A matching hole is drilled in the doorframe at a position to receive the latch bolt and a similar cutout is formed for an opposing striker plate. Here, too, it is necessary that the cuts be positioned precisely for the door to latch properly.

SUMMARY OF THE INVENTION

The present invention provides a method and apparatus for accurately positioning two opposing marks on two opposing surfaces, which can be used for installing two members in accurate registration with one another, such as in the installation of the security alarm magnet/switch pair mentioned above or for other such installations.

Briefly, a marking device according to the invention includes a flexible, foldable, flat sheet, which has a fold at its midportion so that a first half of the sheet can be folded back upon the second half. The two halves contain matching patterns of holes such that when the sheet is in its folded configuration the holes in each pattern lie in registration with one another. The two halves of the sheet contain corresponding indicia, which label corresponding holes of the two patterns. The opposing end portions of the two halves can each be removably secured to the structure being marked.

With the above device two opposed marks may be made on opposing surfaces by positioning the strip against the first surface to be marked and securing the strip in this position. One of the holes of the pattern lying in a desired position is then selected, and a mark is made on the surface through the hole with a writing implement. The identifying indicia for the marked hole are noted. The second surface is then brought into a position of opposition with the first surface and the second side of the strip is secured in position against the second surface. The first half of the strip is then released from the first surface and that surface is moved out of the way. The hole in the second side of the strip is then located which has the same identifying indicia as the selected hole in the first side and a mark is made through that hole in the second surface. Because the two marks are made through two holes in registration with one another, they will be in alignment with one another when the marked surfaces are in opposed pattern.

Marking the locations of the holes in this manner is fast and accurate. The professional will save a significant amount of time in the installation of hardware requiring aligned holes or cuts. With the present invention the do-it-yourself or weekend carpenter will also be able to position precisely aligned holes or cuts quickly and without the frustrations which sometimes result from a long series of awkward measurements.

Other features, characteristics or advantages of the invention are described hereinbelow or will readily be apparent to those skilled in the art from the following specifications and drawings of an illustrative embodiment.

DETAILED DESCRIPTION OF AN ILLUSTRATIVE EMBODIMENT

Figure 1:
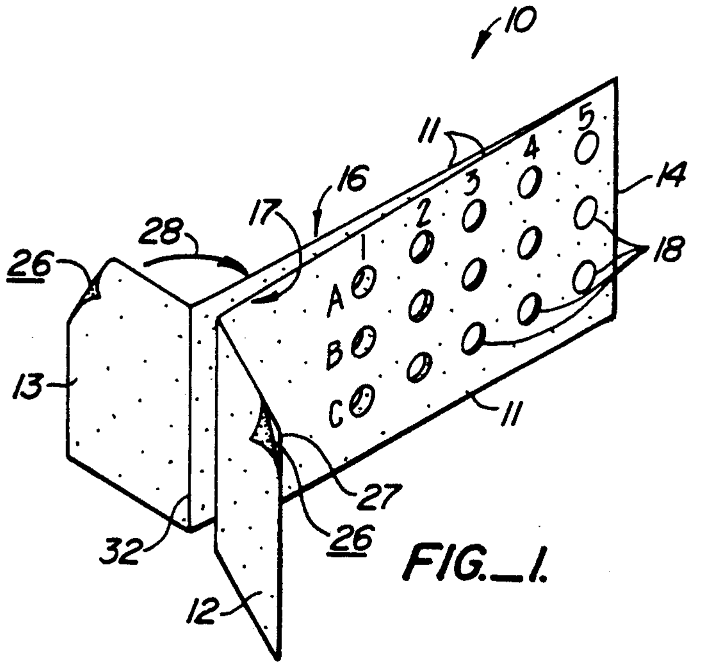
FIG. 1 is a perspective view of a precision alignment device according to the invention.

FIG. 1 shows an embodiment of an alignment device according to the invention, which is in the form of an elongate sheet or strip 10 having generally coextensive parallel longitudinal edges 11. Centrally disposed between the two end portions 12 and 13 of the strip is a fold 14 extending generally perpendicular to the longitudinal direction of the strip such that the strip may be folded back on itself. The sheet itself is formed of a material which is sufficiently flexible and foldable to allow it to conform to irregular surfaces which typically arise in use, as explained more fully below. For example, mylar is a suitable sheet material, although the specific composition of the material is not significant for the practice of the invention provided only that the material be sufficiently flexible and foldable.

The fold 14 divides the sheet into two halves 16 and 17. A pattern of holes 18 is formed in the first half 16 and a matching pattern of holes 19 is formed in the second half 17. The two patterns 18 and 19 are so disposed that when the first and second halves of the strip are folded on top of one another the holes of the two patterns overlie one another. The holes of the two patterns are marked with identifying indicia 21 and 22 such that two overlying holes are marked with the same identifying indicia. In the embodiment of FIG. 1 the holes of the patterns are laid out in a regular rectangular array and a hole of the array is identified by the alphanumeric labels of the row and column of the hole.

In operation the two halves are removably secured to the members whose surfaces are to be marked. To accomplish the necessary securement, the end portions of the strip, in particular, are adapted to be removably secured to the surface of the members. In the embodiment of FIG. 1 securement is provided by an adhesive applied to the outwardly facing surface of the end portions as indicated at 26. That portion of the strip to which the adhesive is applied may have a removable protective covering 27 or may be folded over against the strip as indicated by arrow 28 so as to provide a protective covering to the adhesive-coated surface area. Those skilled in the art will readily appreciate that other means may also be used for adhering or otherwise securing the strip to the supporting members. For example, a double-sided replaceable tape may be used in place of the adhesive. The end portion of the strip may also be secured to the surface of the building material with a piece of single-sided tape applied at the end. Although the benefits of the invention will still be achieved with single-sided tape, this is not the preferred mode for practicing the invention because it is more awkward to apply the single-sided tape, it requires the use of a separate tape dispenser and may possibly damage the strip upon removal.

Figure 2A:
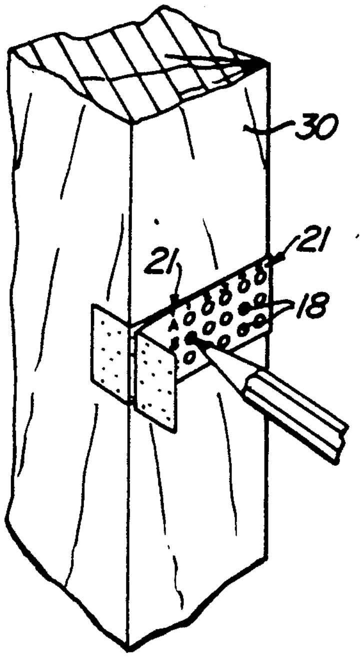
FIGS. 2A–2C are a sequence of perspective views showing the manner of using the device of FIG. 1 to locate opposing marks in the edges of a door and door frame.

The method for using the strip is illustrated with reference to the series of FIGS. 2A, 2B, and 2C, which illustrate the making of precision aligned marks in the edge of a door 30 and doorframe 31. The pair of aligned marks shown in FIGS. 2A–2C are such as would be made in the installation of a magnet and switch unit as used in certain types of burglar alarm systems.

First, one side of the strip is positioned against the edge of the door and is held in that position with the adhesive at the end portion of that half of the strip. As illustrated in FIG. 2A, if the strip is formed with a fold 32 at one end, that fold may conveniently be used for positioning the strip at the corner of the door. After the strip is secured in position, one of the holes corresponding to the desired position is selected and a mark is made in the edge of the door, for example, with a writing implement or with an appropriate tool, such as a scribe or awl. The alphanumeric designation of the selected hole is then noted. At this stage the strip may be in its unfolded or folded configuration. The strip preferably carries the hole-identifying indicia on both sides of both halves so that the indicia will be visible whether the strip is folded or unfolded.

Figure 2B:
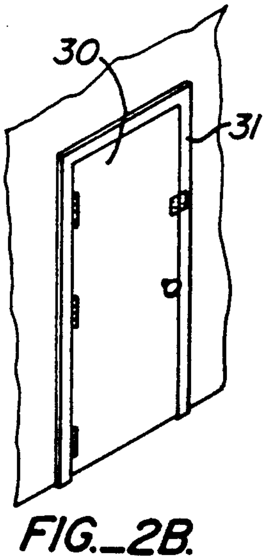
Figure 2C:
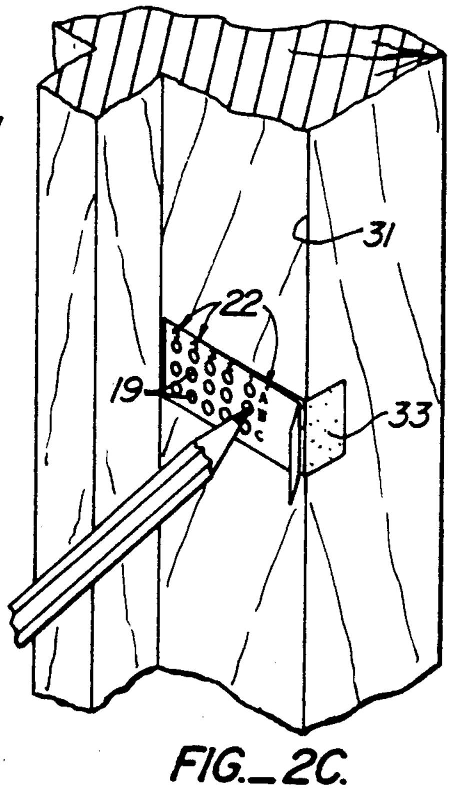

The second half of the strip is then folded up against the first half if this had not initially been done, and the door is closed, as illustrated in FIG. 2B. The protruding end portion 33 of the second half of the strip is then secured to the doorframe by means of the adhesive on the surface of the end portion. The end portion of the first half of the strip, which had been secured to the door, is then removed from the door and the door is opened as illustrated in FIG. 2C. During this operation, the strip is held in position against the doorframe by the adhesive on the second end portion. With the door now opened, the pattern of holes against the door frame is now accessible. A hole is selected in the second half of the strip which has the same identifying indicia as the first hole used to mark the edge of the door, and a mark is made through this hole in the doorframe. Since holes having the same identifying indicia overlie one another, the two marks will be found in a position of precise alignment or registration with one another. The strip may then be removed from the doorframe. After the opposed marks are made in the door and doorframe, the appropriate sized holes are drilled in the conventional manner.

Because the strip is flexible, it may easily be bent or folded as the need may be to follow the contour of any edges, ridges, or curved surfaces which may be presented, for example, by a molding strip abutting against the door frame. While such molding strips sometimes make precise measurements difficult, with the present invention the holes may still be precisely positioned because of the ability of the strip to follow, and the adhesive portion to adhere to, the irregular contour.

While the above provides a full disclosure of illustrative embodiments of the invention, various modifications, alternate constructions, and equivalents may be employed without departing from the spirit and scope of the invention. Therefore, the invention is not to be limited to the above illustrative embodiments, but is defined by the appended claims.

What is claimed is:

1. A device for positioning opposed marks on opposing surfaces comprising:
   - a flexible, foldable, flat sheet having a centrally disposed fold therein, whereby a first half of said sheet is foldable back upon a second half of said sheet;
   - a first pattern of holes defined in said first half of said sheet, and a matching pattern of holes defined in said second half of said sheet, said matching pattern being formed and arranged in said sheet so as to lie in registration with said first pattern when said second half is folded back upon said first half, whereby marks positioned on said opposing surfaces through corresponding holes in said first and matching patterns will oppose one another;
   - indicia on said first half for labeling the holes of said first pattern and corresponding indicia on said second half for labeling corresponding holes of said matching pattern; and
   - means for removably securing opposed end portions of said sheet to said surfaces.

2. A method of positioning opposed marks on opposing surfaces comprising the steps of:
   - removably securing a first pattern of holes in position against a first of said opposing surfaces;
   - selecting a hole from said first pattern;
   - marking said first opposing surface at the selected hole;
   - positioning a matching pattern of holes in registration with said first pattern;
   - removably securing said matching pattern in position against the second of said opposing surfaces while said matching pattern is in registration with said first pattern, and removing said first pattern from said first opposing surface;
   - marking said second opposing surface at the hole position of said matching pattern corresponding to the selected hole in said first pattern; and
   - removing said matching pattern from said second opposing surface.

* * * * *